(12) United States Patent
Shue et al.

(10) Patent No.: US 8,738,637 B2
(45) Date of Patent: May 27, 2014

(54) GENERATING SHARABLE RECOMMENDED AND POPULAR E-MAILS

(75) Inventors: Jyh-Shin Shue, Taipei (TW); Jeff Weng, Taipei (TW)

(73) Assignee: Yahoo! Inc., Sunnyvale, CA (US)

( * ) Notice: Subject to any disclaimer, the term of this patent is extended or adjusted under 35 U.S.C. 154(b) by 493 days.

(21) Appl. No.: 12/132,572

(22) Filed: Jun. 3, 2008

(65) Prior Publication Data

US 2009/0300050 A1  Dec. 3, 2009

(51) Int. Cl.
*G06F 17/30* (2006.01)

(52) U.S. Cl.
CPC ............................. *G06F 17/30011* (2013.01)
USPC .......................................... 707/750; 707/770

(58) Field of Classification Search
None
See application file for complete search history.

(56) References Cited

U.S. PATENT DOCUMENTS

| | | | | |
|---|---|---|---|---|
| 6,829,635 | B1 * | 12/2004 | Townshend | 709/206 |
| 7,373,520 | B1 * | 5/2008 | Borthakur et al. | 713/189 |
| 2005/0021643 | A1 * | 1/2005 | Watanabe et al. | 709/206 |
| 2005/0138043 | A1 * | 6/2005 | Lokken | 707/100 |
| 2005/0284935 | A1 * | 12/2005 | Sinha | 235/386 |
| 2007/0288439 | A1 * | 12/2007 | Rappaport et al. | 707/3 |
| 2008/0319973 | A1 * | 12/2008 | Thambiratnam et al. | 707/5 |
| 2009/0164517 | A1 * | 6/2009 | Shields et al. | 707/104.1 |

* cited by examiner

*Primary Examiner* — Sangwoo Ahn
(74) *Attorney, Agent, or Firm* — James J. DeCarlo; Greenberg Traurig, LLP

(57) ABSTRACT

A method of determining popularity of an e-mail is provided. The method includes receiving an e-mail and determining if a generated signature is associated with the e-mail. If there is no generated signature, then a signature is generated for associating with the e-mail. A popularity measure associated with the e-mail is determined based on the signature. Furthermore, a method of determining popularity of an e-mail is provided. The method includes receiving an e-mail and identifying a generated signature associated with the e-mail. The method further includes determining a match of the associated generated signature with a record of the generated signature, if the generated signature is identified. If the identified generated signature is determined to match the record of the generated signature, then a popularity measure associated with the e-mail is increased.

26 Claims, 7 Drawing Sheets

GENERATING SHARABLE RECOMMENDED AND POPULAR E-MAILS

BACKGROUND OF THE INVENTION

Electronic mail, or e-mail, is a widespread form of communication between different users. With e-mail messages, a user may send a message to one or more recipients almost instantaneously. Businesses and users may use e-mail for advertising and other types of solicitations. Additionally, e-mail is frequently used to share interesting images, text, and news, for example, with friends and contacts.

If an e-mail is interesting to a user, that user may then forward the e-mail to his other friends or contacts. In other words, unless a user is a recipient of the e-mail, the user will not be able to view the popular e-mail. Therefore, even though there are popular e-mails, some of the community of users able to receive e-mail may not be able to access those popular e-mails.

Furthermore, some e-mails may be rated higher, or recommended, by more users than other e-mails. Currently, a user viewing the e-mail is not able to know if other users who have viewed the e-mail recommend that particular e-mail.

Therefore, an option for users to share certain e-mails without forwarding the actual e-mail is desired. Furthermore, a method and system for determining popular and recommended e-mails is desired.

BRIEF SUMMARY OF THE INVENTION

In accordance with embodiments of the present invention, a method of determining popularity of an e-mail is provided. The method includes receiving an e-mail and determining if a generated signature is associated with the e-mail. If there is no generated signature, then a signature is generated for associating with the e-mail. A popularity measure associated with the e-mail is determined based on the signature.

In accordance with embodiments of the present invention, a method of determining popularity of an e-mail is provided. The method includes receiving an e-mail and identifying a generated signature associated with the e-mail. The method further includes determining a match of the associated generated signature with a record of the generated signature, if the generated signature is identified. If the identified generated signature is determined to match the record of the generated signature, then a popularity measure associated with the e-mail is increased.

Moreover, in accordance with embodiments of the present invention, a computer-readable medium comprising instructions for a processor. The instructions include instructions for receiving an e-mail and identifying a generated signature associated with the e-mail. The instructions further include instructions for determining a match of the associated generated signature with a record of the generated signature, if the generated signature is identified. The instructions include instructions for increasing a popularity measure associated with the e-mail, if the identified generated signature is determined to match the record of the generated signature.

Furthermore, in accordance with embodiments of the present invention, an apparatus for determining popularity of an e-mail includes for logic for receiving an e-mail, a processor, and a memory. The processor comprises logic for determining if the e-mail has an associated generated signature, logic for identifying the generated signature from the received e-mail for determining a match with a record of the generated signature, if the email has a generated signature, and logic for increasing a popularity measure associated with the e-mail, if the extracted generated signature is determined to match the record. The memory is for storing the record of the generated signature.

Other features and aspects of the invention will become apparent from the following detailed description, taken in conjunction with the accompanying drawings which illustrate, by way of example, the features in accordance with embodiments of the invention. The summary is not intended to limit the scope of the invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown.

Figure 1:
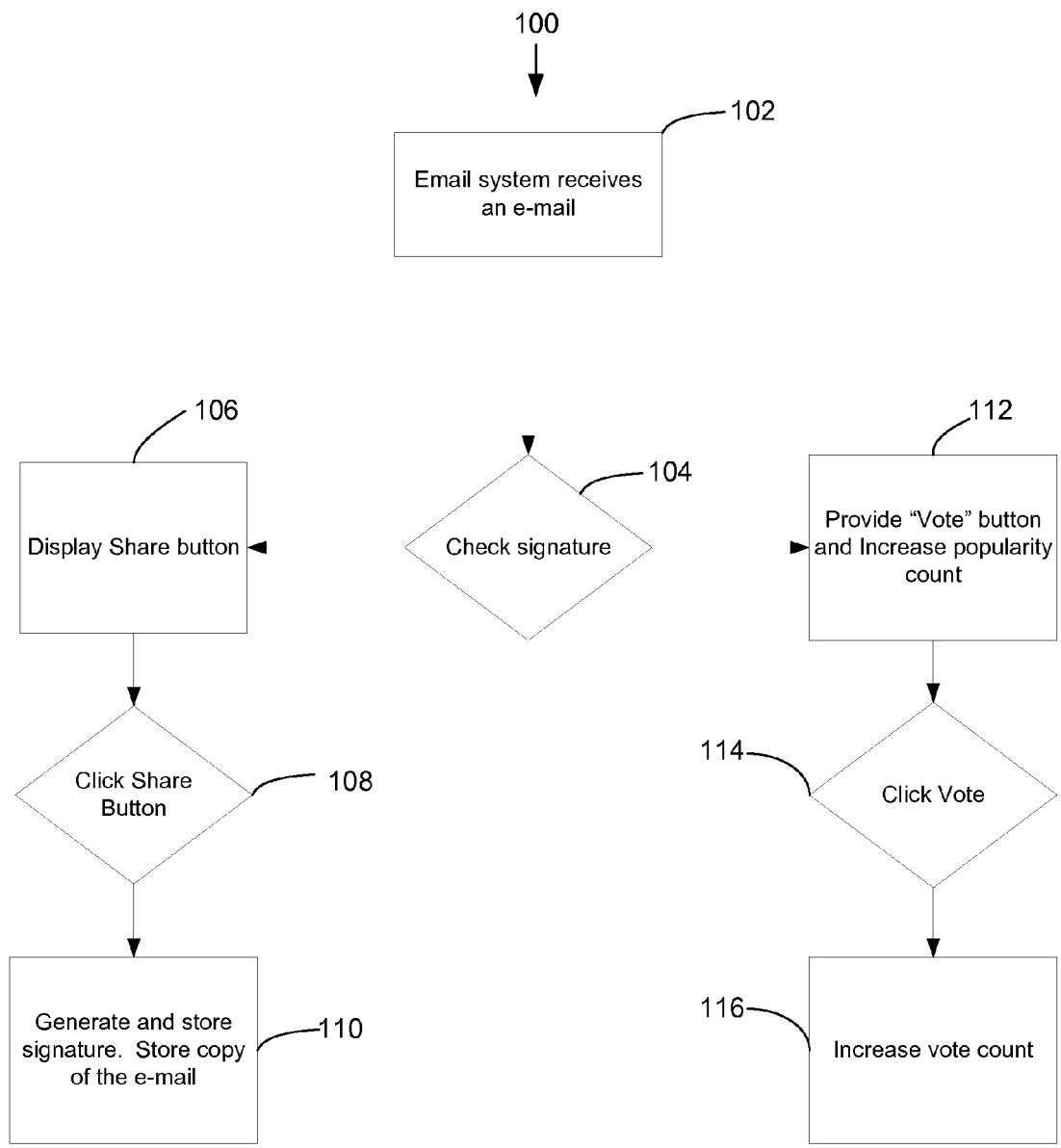
FIG. 1 illustrates a flowchart of a method of generating sharable recommended and popular e-mails according to embodiments of the invention.

FIG. 1 illustrates a flowchart of a method 100 of generating sharable recommended and popular e-mails according to embodiments of the invention. In 102, an e-mail is received. The signature is checked 104. Checking the signature includes determining if there is a signature associated with the received e-mail exists. A signature may be, for example, a sequence of characters that can represent unique e-mail content. For example, a signature can be an MD5 checksum of an e-mail, or a unique string calculated from normalized e-mail content. If an associated signature exists, a record of the associated signature has previously been generated. The associated signature is checked with the record to identify the received e-mail.

If no signature can be identified, then the received e-mail may not been shared by any user. A mechanism for sharing the received e-mail is provided to the user. This mechanism may be a share button displayed on the e-mail user interface 106. The mechanism for sharing the received e-mail enables a user to share the received e-mail with friends or contacts. If the user performs a user action with the mechanism for sharing 108, such as clicking the share button, a signature is generated for association with the received e-mail and a copy of the e-mail is stored as a record associated with the generated signature 110. If the user would like to share the e-mail with contacts or friends, a share ID may be sent. Using the share ID, another user may access the copy of the e-mail, without receiving the e-mail as a forwarded message.

In embodiments of the invention, the signature may be generated automatically. A user may have the option for automatic signature generation. In an automatic signature generation mode, an signature will be automatically generated for the received e-mail, if there is no signature already associated with the e-mail. Furthermore, when a user clicks on the "share" button, the signature is compared and "share ID" will be added to the same signature that already generated automatically instead of adding a new entry.

If an associated signature is identified for the received email and the associated signature matches the stored record of the associated signature 104, the popularity measure is increased 114. The popularity measure is stored such that the popularity can be determined for an email.

If an e-mail signature is automatically generated, the popularity measure may be increased for every incoming e-mail without any user actions to share the e-mail. In some embodiments, however, the e-mail may only be displayed to other users after a user clicks the "share" button.

Furthermore, a mechanism for a user to increase a recommendation measure is provided to the user 112. In embodiments of the invention, the mechanism for the user to increase a recommendation measure may not be available to the user unless a signature has already been associated with the e-mail. The mechanism may be a vote button displayed to the user on a user interface. A user action performed on the mechanism to increase a recommendation measure, such as the user clicking on the vote button 114. The user action can increase a recommendation count, or vote count, for the received e-mail 116. In this way, a user may choose to recommend the e-mail if the user believes that there is interesting information in the e-mail that other people would like to see, for example. The recommendation count is stored, and other users who choose to recommend the e-mail will increase the recommendation count.

Figure 2:
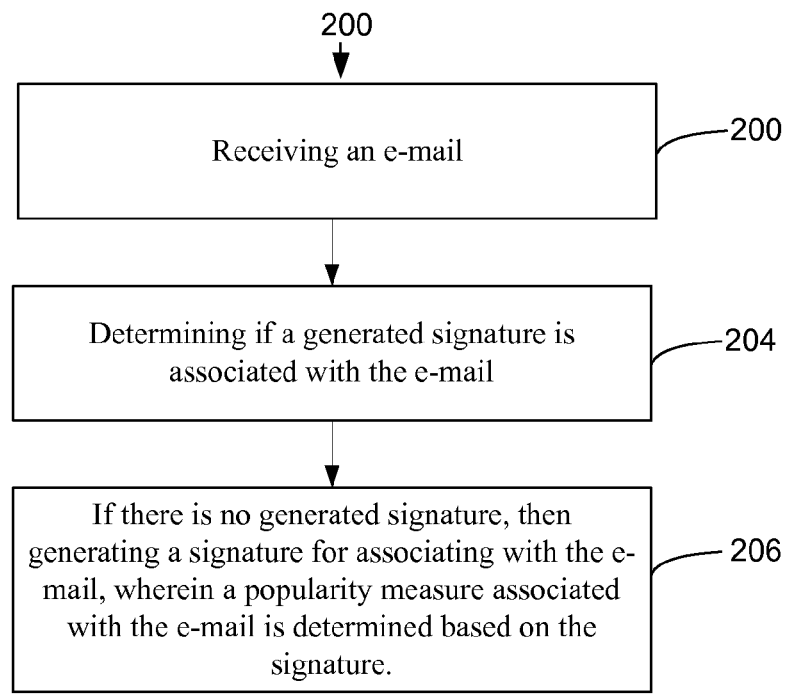
FIG. 2 illustrates a method generating a signature according to embodiments of the invention.
Figure 3:
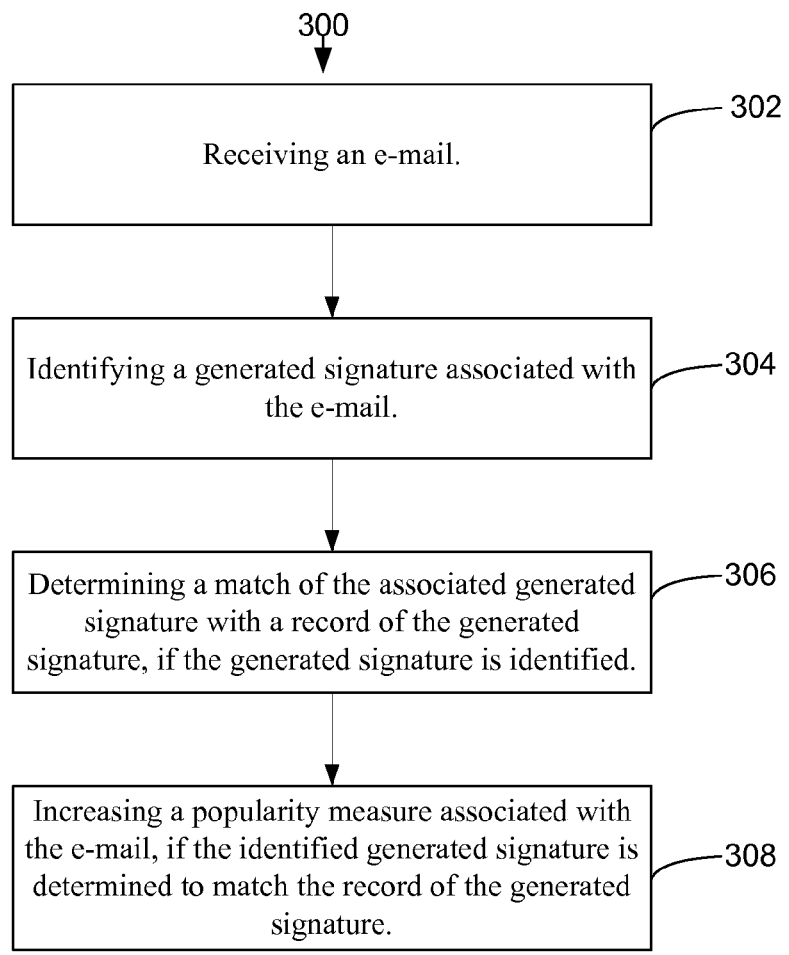
FIG. 3 illustrates a method of increasing a popularity measure of an e-mail according to embodiments of the invention.

As illustrated in FIGS. 2 and 3, a method of generating an associated signature for sharing an e-mail 200, and determining popularity and recommendation measures according to embodiments of the invention 300, are depicted. With reference to FIG. 2, an e-mail is received 202. It is then determined if there is a generated signature is associated with the received e-mail 204. If there is no generated signature associated with the received e-mail, then a signature is generated and associated with the email 206. A record of the generated signature is stored along with a copy of the e-mail. Determining the popularity and level of recommendation for the e-mail is based on the associated generated signature, as illustrated in FIG. 3.

Method 300, according to embodiments of the invention, illustrates determining a popularity measure for a received e-mail based on a generated signature associated with the received e-mail. After an e-mail is received 302, a generated signature associated with the e-mail is identified 304. The identified generated signature is matched to a record of the generated signature 306. The popularity measure is increased after it is determined the generated signature matches the record of the generated signature 308.

Moreover, a recommendation measure may also be modified based on identifying a generated signature associated with an e-mail. As well as increasing the popularity measure associated with the e-mail, if the generated signature is matched to a stored record of the generated signature, the user is provided a mechanism for recommending the e-mail. The recommendation measure, also called the "buzz" of an e-mail, determines the recommendation level according to other users.

In embodiments of the invention, a popularity indicator, based on the popularity measure, may be provided to a user to show the popularity level of an e-mail. The popularity indicator may be provided on the e-mail user-interface.

Similarly, a recommendation indicator may be provided to the user to show the recommendation level of an e-mail. The recommendation indicator is based on the recommendation measure.

Furthermore, a mixed indicator may be provided to users. The mixed indicator may be based in part on the recommendation measure and the popularity measure of an e-mail.

For example, according to embodiments of the invention, John receives an e-mail. After reading it, he thinks this email is interesting, and decides he would like to share this e-mail with a friend. John clicks on a "share mail" button on his e-mail user interface. The e-mail system generates a signature to associate with this e-mail. Now, when other people receive this e-mail, the e-mail system will recognize this e-mail as the same e-mail that John originally shared. Therefore, when other people receive this same e-mail, the e-mail system displays a "vote mail" button along with the e-mail at the user-interface.

According to some embodiments of the invention, a similarity threshold will be defined to determine if two e-mails may be similar. Similarity may be determined by using text mining technologies to do similarity clustering. If two e-mails are determined to be similar, then the two e-mails may be associated in the e-mail system. This way, popularity and recommendation measures for both e-mails are associated with either e-mail.

Figure 4:
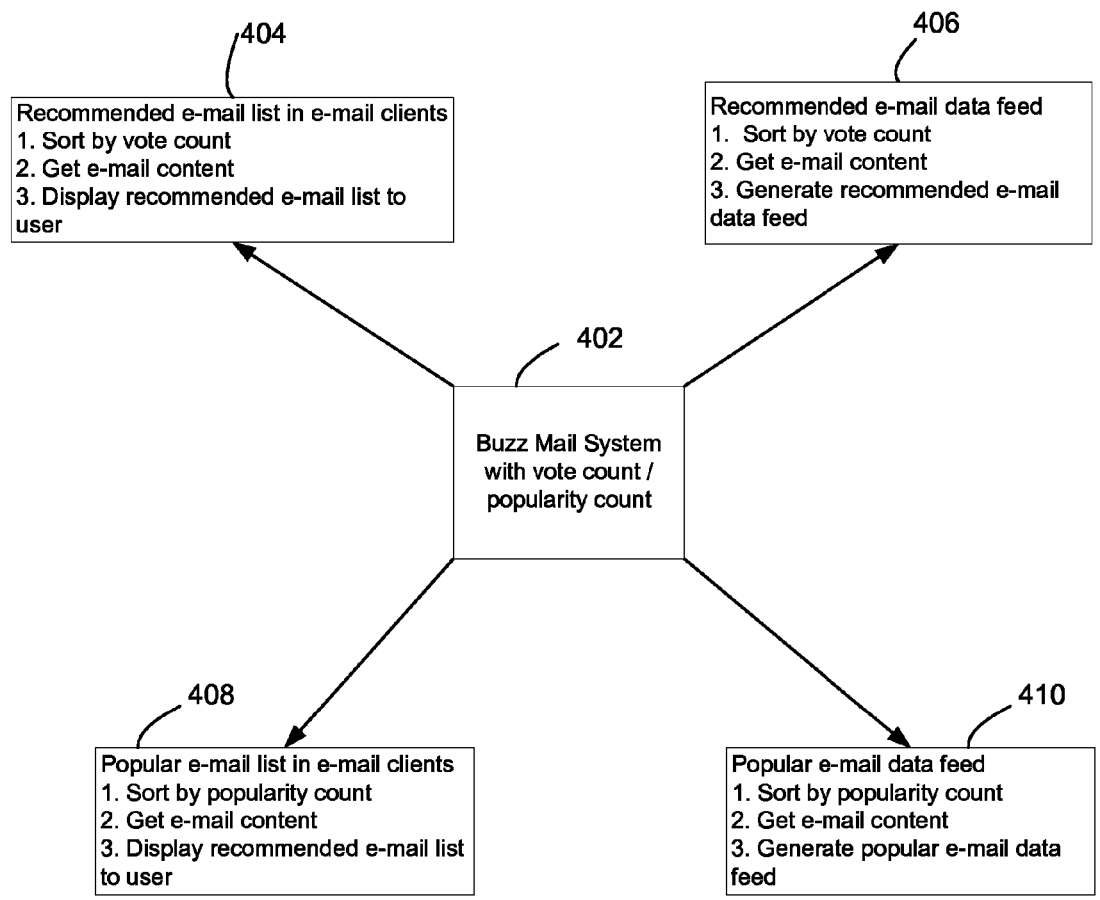
FIG. 4 illustrates some functions of a system for generating sharable recommended and popular e-mails according to embodiments of the invention.

FIG. 4 illustrates applications of the popularity and recommendation measures according to embodiments of the invention. As illustrated in 404, recommendation measures may be used to generate lists of the most recommended e-mails at e-mail clients. According to embodiments of the invention, a recommendation measure may be a count so that the higher the count, the higher the recommendation of the e-mail. The recommended e-mail list may be called "buzz mail." The buzz mail list, or recommendation list, is sorted by the recommendation counts. The user is able to access the recommended e-mail by a share ID via a link, for example, which provides the content of the e-mail to the user accessing the recommendation list.

As illustrated in 406, the recommendation measure may also be generated into a data feed as input for other applications. The data feed may be an RSS feed, for example.

Similar to the applications of the recommendation measure, as illustrated in 408, the popularity measure may also be used to generate a popular mail list for displaying on e-mail clients, for example. A popularity list shows popular e-mails ordered by associated popularity measures, or counts. The popularity list allows a user to access the contents of the e-mail by accessing the share ID.

Also, similar to the applications of the recommendation measure, a popular e-mail data feed may be generated for input to other applications.

Figure 5:
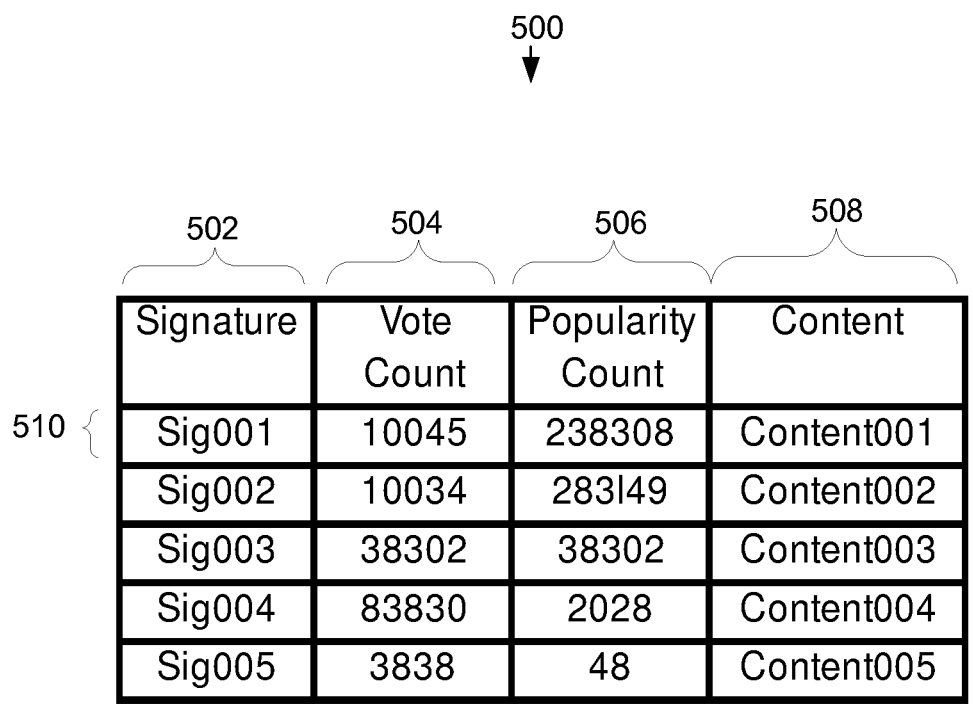
FIG. 5 illustrates a record of including popularity and recommendation measures of a plurality of e-mails according to embodiments of the invention.

The popularity measures, recommendation measures, and copies of the e-mail content are associated with generated signatures, and stored in a record. FIG. 5 illustrates a record of including popularity and recommendation measures of a plurality of e-mails according to embodiments of the invention. The generated signatures 502 are stored for a plurality of e-mails. The recommendation measures 504, and the popularity measures 506, are stored for each e-mail. Additionally, according to embodiments of the invention, the contents of the plurality of e-mails 508 are stored in the record.

In entry 510, the signature "sig001" is stored for a first e-mail. For the first e-mail a recommendation measure of "10045" is stored. A popularity measure of "238308" is stored for the first e-mail. The content of the first e-mail "Content001" is also stored in the entry.

Figure 6:
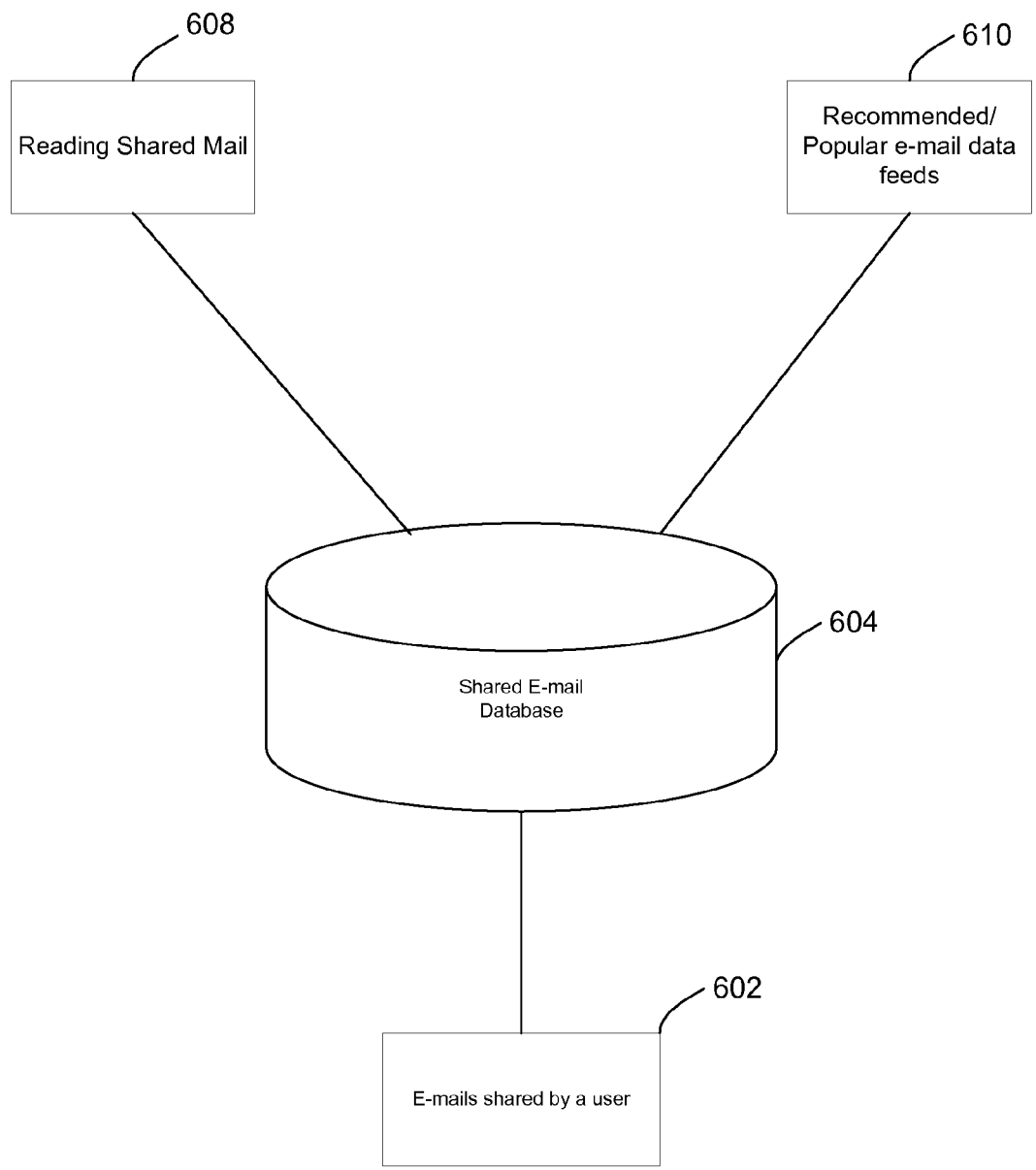
FIG. 6 illustrates a shared mail database according to embodiments of the invention.

Records of the received e-mails, popularity measures, recommendation measure, and copies of e-mail contents may be stored in a database associated with the e-mail server. FIG. 6 illustrates a shared mail database according to embodiments of the invention. After e-mails have been shared by a user, by a user clicking a "share" button, for example, the shared e-mail 602 are stored in the e-mail database 604. When users would like to read the shared e-mail, users are able to access the record of the copy of the shared e-mail from the shared e-mail database 604 so that they may view the contents of the e-mail 608. Also stored in the shared e-mail database 604 are the recommendation and popular measures for shared e-mail. Data feeds relating to the recommendation measures and popularity measures 610 may be received from the shared e-mail database 604.

Figure 7:
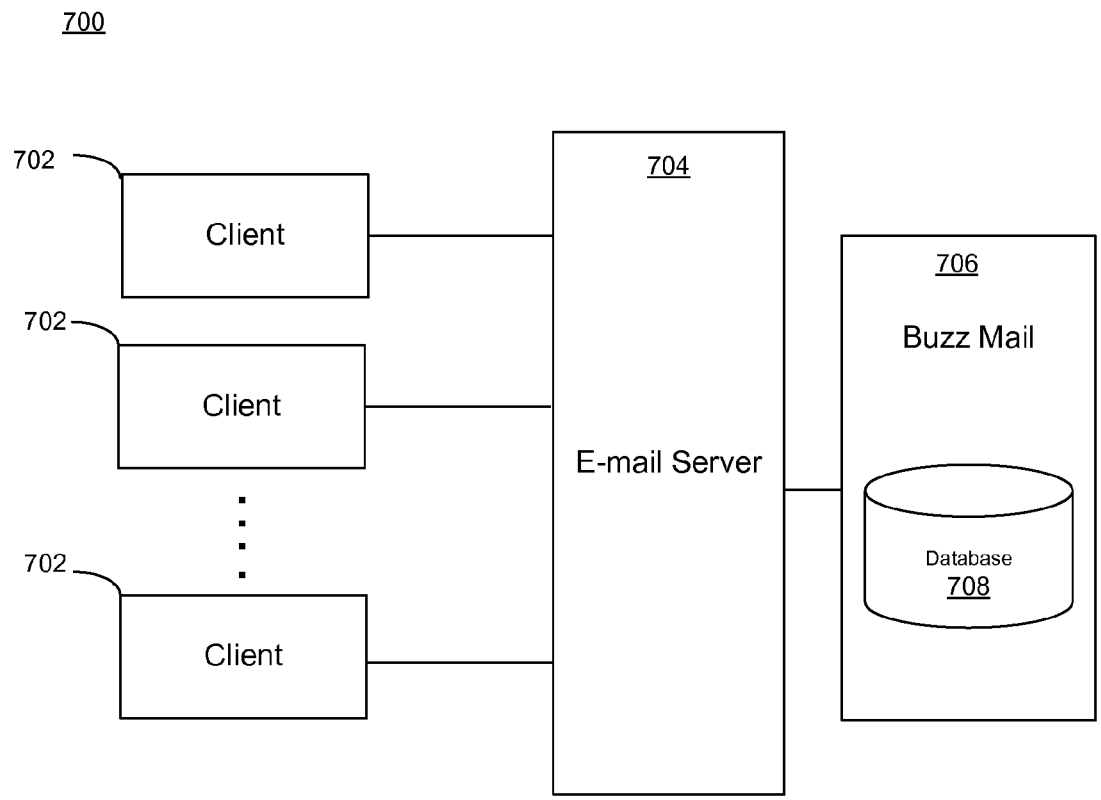
FIG. 7 illustrates a block diagram of an e-mail client, e-mail server, and buzz mail system according to embodiments of the invention.

FIG. 7 illustrates a block diagram of a client/server system 700 according to embodiments of the invention. A plurality of clients 702 send and receive e-mail from an e-mail server 704. Associated with the e-mail server 704 is a system for generating sharable e-mails and for generating popularity measures and recommendation measures, a "buzz mail" system 706 for e-mails received at the e-mail server 704. The buzz mail system 706 includes database 708 for storing records of e-mails, including the aforementioned generated signature, popularity measures, recommendation measures, and e-mail contents.

While aspects of the invention, including the above described systems and methods, are described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic, and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Figure 8:
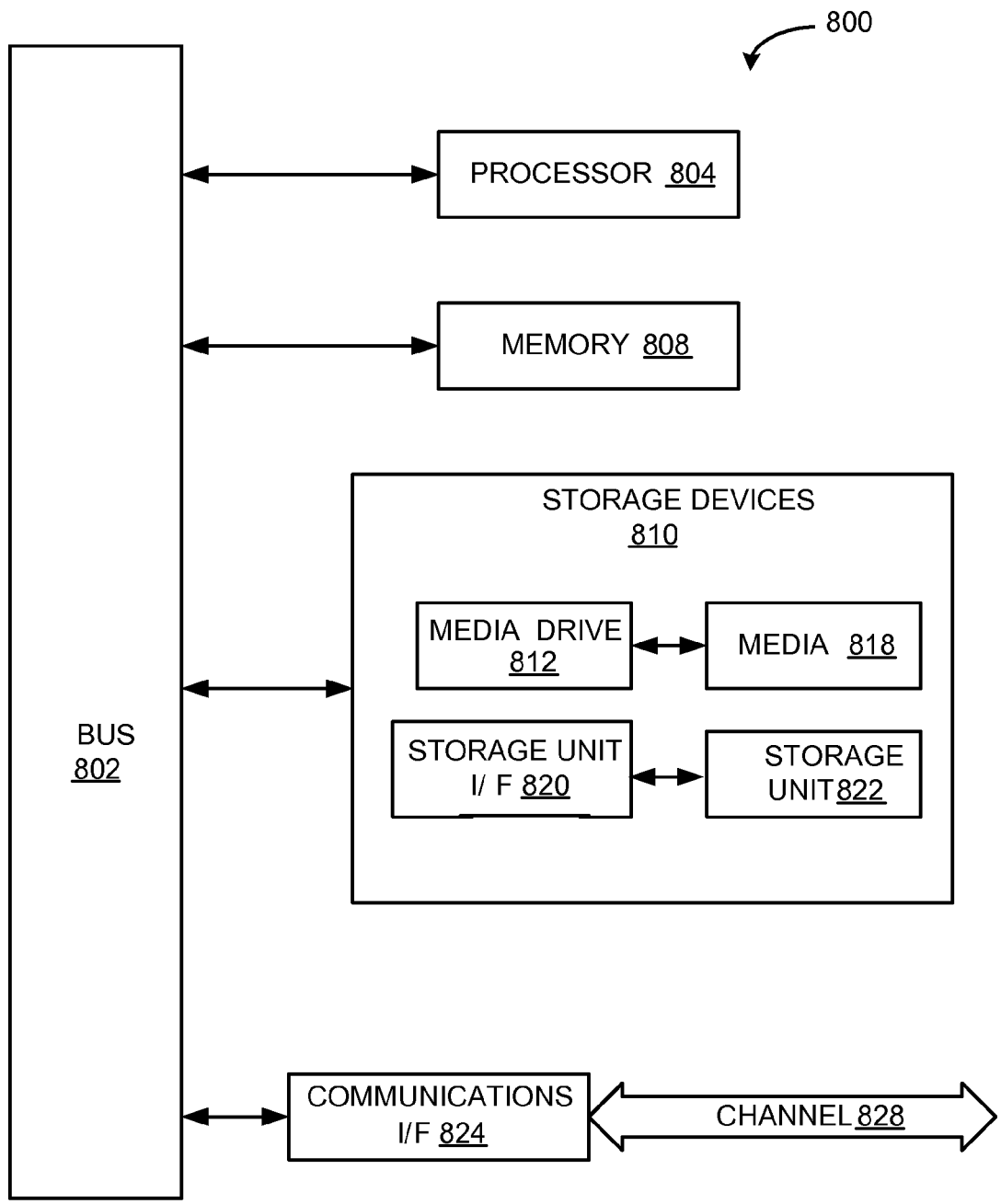
FIG. 8 illustrates a block diagram of a computing system according to embodiments of the invention.

FIG. 8 illustrates an exemplary computing system 800 that may be employed to implement processing functionality for various aspects of the invention (e.g., as a server device, client device, database, presence platform, combinations thereof, and so on). Those skilled in the relevant art will also recognize how to implement the invention using other computer systems or architectures. Computing system 800 may represent, for example, a desktop, mainframe, server, client, or any other type of special or general purpose computing device as may be desirable or appropriate for a given application or environment. Computing system 800 can include one or more processors, such as a processor 804. Processor 804 can be implemented using a general or special purpose processing engine such as, for example, a microprocessor, microcontroller or other control logic. In this example, processor 804 is connected to a bus 802 or other communication medium.

Computing system 800 can also include a main memory 808, for example random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory ("ROM") or other static storage device coupled to bus 802 for storing static information and instructions for processor 804.

The computing system 800 may also include information storage mechanism 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 818 may include, for example, a hard disk, floppy disk, magnetic tape, optical disk, CD or DVD, or other fixed or removable medium that is read by and written to by media drive 814. As these examples illustrate, the storage media 818 may include a computer-readable storage medium having stored therein particular computer software or data.

In alternative embodiments, information storage mechanism 810 may include other similar instrumentalities for allowing computer programs or other instructions or data to be loaded into computing system 800. Such instrumentalities may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a USB port), a PCMCIA slot and card, etc. Software and data transferred via communications interface 824 are in the form of signals which can be electronic, electromagnetic, optical, or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable medium" may be used generally to refer to media such as, for example, memory 808, storage device 818, storage unit 822, or signal(s) on channel 828. These and other forms of computer-readable media may be involved in providing one or more sequences of one or more instructions to processor 804 for execution. Such instructions, generally referred to as "computer program code" (which may be grouped in the form of computer programs or other groupings), when executed, enable the computing system 800 to perform features or functions of embodiments of the present invention.

In an embodiment where the elements are implemented using software, the software may be stored in a computer-readable medium and loaded into computing system 800 using, for example, removable storage drive 814, drive 812 or communications interface 824. The control logic (in this example, software instructions or computer program code), when executed by the processor 804, causes the processor 804 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention. Moreover, aspects of the invention describe in connection with an embodiment may stand alone as an invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A method comprising:
   receiving, at a computing device, an e-mail;
   determining, via the computing device, if a signature associated with the e-mail has been generated;
   if it is determined that no signature associated with the e-mail has been generated, the computing device:
   causing a mechanism for sharing the e-mail to be made available to a user; and
   generating a signature by calculating the e-mail's signature from content of the e-mail for association with the e-mail;
   identifying a match of the associated generated signature with a record of the generated signature upon the determination that the associated signature has been generated;
   maintaining a vote count for the received e-mail, the e-mail's vote count determined using voting input received via a mechanism made available upon a determination that a signature associated with the e-mail has been generated; and
   increasing, via the computing device, a popularity measure associated with the e-mail upon the identified generated signature being determined to match the record of the generated signature, wherein the popularity measure and vote count are used for generating a popularity data item of e-mail data, the e-mail data facilitating display and sharing of the e-mail and comprising at least one data item being based on user input indicative of user interest in the e-mail.

2. The method of claim 1, the mechanism made available upon a determination that a signature associated with the e-mail has been generated comprises a mechanism to increase a recommendation measure associated with the e-mail, the recommendation measure being based on the vote count maintained for the e-mail.

3. The method of claim 2, wherein the mechanism made available upon a determination that a signature associated with the e-mail has been generated is a vote button.

4. The method of claim 3, wherein the vote button is provided if there are a generated signature and a share ID associated with the e-mail.

5. The method of claim 2, wherein the recommendation measure is used for generating recommended e-mail data.

6. The method of claim 1, further comprising displaying a popularity indicator to the user, wherein the popularity indicator is based on the popularity measure.

7. The method of claim 2, further comprising displaying a recommendation indicator to the user, the recommendation indicator is based on the recommendation measure.

8. The method of claim 2, further comprising displaying a mixed indicator, wherein the mixed indicator is based on the recommendation measure and the popularity measure.

9. The method of claim 1, wherein determining a match with the record of the generated signature comprises determining a similarity measure and comparing the similarity measure with a threshold.

10. A non-transitory computer-readable storage medium encoded with computer instructions implementable by a processor, the instructions comprising instructions for:
    receiving an e-mail;
    determining if a signature associated with the e-mail has been generated;
    if it is determined that no signature associated with the e-mail has been generated:
    causing a mechanism for sharing the e-mail to be made available to a user; and
    generating a signature by calculating the e-mail's signature from content of the e-mail for association with the e-mail;
    identifying a match of the associated generated signature with a record of the generated signature upon the determination that the associated signature has been generated; and
    maintaining a vote count for the received e-mail, the e-mail's vote count determined using voting input received via a mechanism made available upon a determination that a signature associated with the e-mail has been generated; and increasing a popularity measure associated with the e-mail upon the identified generated signature being determined to match the record of the generated signature, wherein the popularity measure and vote count are used for generating popularity data item of e-mail data, the e-mail data facilitating display and sharing of the e-mail and comprising at least one data item being based on user input indicative of user interest in the e-mail.

11. The non-transitory computer-readable storage medium of claim 10, wherein the mechanism made available upon a determination that a signature associated with the e-mail has been generated comprises a vote button, increasing a recommendation measure associated with the e-mail comprises providing the vote button to the user and increasing a recommendation measure of the e-mail in response to receiving input via the vote button.

12. The non-transitory computer-readable storage medium of claim 11, wherein the vote button is provided only if there are a share ID and the generated signature associated with the e-mail.

13. The non-transitory computer-readable storage medium of claim 10, the instructions further comprising instructions for displaying a popularity indicator to the user based on the popularity measure.

14. The non-transitory computer-readable storage medium of claim 10, the instructions further comprising instructions for displaying a recommendation indicator to the user, the recommendation indicator is based on the vote count.

15. The non-transitory computer-readable storage medium of claim 10, the instructions further comprising instructions for displaying a mixed indicator, wherein the mixed indicator is based on the vote count and the popularity measure.

16. The non-transitory computer-readable storage medium of claim 10, wherein determining a match with the record of the generated signature comprises determining a similarity measure and comparing the similarity measure with a threshold.

17. The non-transitory computer-readable storage medium of claim 10, the mechanism for sharing the e-mail comprising a share button, the instructions further comprising instructions for generating the associated signature before providing the share button to the user, if the e-mail does not have a generated signature.

18. The non-transitory computer-readable storage medium of claim 17, the instructions further comprising instructions for generating a share ID associated with the e-mail in response to receiving input via the share button, and storing a record of the e-mail, the record comprising the generated signature and the share ID associated with the e-mail.

19. The non-transitory computer-readable storage medium of claim 18, wherein the share ID allows the record of the e-mail to be displayed to a second user.

20. The non-transitory computer-readable storage medium of claim 18, wherein the record of the e-mail includes content of the e-mail, the content including any text, images, videos, and attachments.

21. A computing device comprising:
a processor;
a storage medium for tangibly storing thereon program logic for execution by the processor, the program logic comprising:
logic executed by the processor for receiving an e-mail;
logic executed by the processor for determining if the e-mail has an associated generated signature;
if the logic executed by the processor determines that no signature associated with the e-mail has been generated, logic executed by the processor for:
causing a mechanism for sharing the e-mail to be made available to a user; and
generating a signature for association with the e-mail by calculating the e-mail's signature from content of the e-mail;
logic executed by the processor for extracting the generated signature from the received e-mail for determining a match with a record of the generated signature upon the e-mail having a generated signature;
logic executed by the processor for maintaining a vote count for the received e-mail, the e-mail's vote count determined using voting input received via a mechanism made available upon a determination that a signature associated with the e-mail has been generated; and
logic executed by the processor for increasing a popularity measure associated with the e-mail upon the extracted generated signature being determined to match the record, wherein the popularity measure and vote count are used for generating popularity data item of e-mail data, the e-mail data facilitating display and sharing of the e-mail and comprising at least one data item being based on user input indicative of user interest in the e-mail, wherein the generated signature is stored in memory associated with the computing device.

22. The computing device of claim 21, the mechanism made available upon a determination that a signature associated with the e-mail has been generated comprising a vote button, the logic executed by the processor further comprising logic executed by the processor for increasing a recommended measure of the e-mail, the recommendation measure being based on the voting count maintained for the e-mail.

23. The computing device of claim 22 further comprising logic for displaying a popularity indicator to a user based on the popularity measure.

24. The computing device of claim 23 further comprising logic for determining a similarity measure and logic for comparing the similarity measure with a threshold.

25. The computing device of claim 21, the mechanism for sharing the e-mail comprising a share button, the device further comprising logic for generating the associated signature before providing the share button to a user, if the e-mail does not have a generated signature.

26. The computing device of claim 25, further comprising logic for generating a share ID associated with the e-mail in response to receiving input via the share button, and a memory for storing a record for the e-mail, the record comprising the associated signature and the share ID generated for the e-mail, wherein the share ID allows the stored e-mail to be displayed to a second user.

* * * * *